United States Patent [19]

Ishikawa et al.

[11] Patent Number: 5,293,280
[45] Date of Patent: Mar. 8, 1994

[54] MAGNETIC RECORDING AND REPRODUCTION APPARATUS FOR DATA PROCESSING UNIT AND MAGNETIC TAPE FOR USE IN SUCH APPARATUS

[75] Inventors: Toshio Ishikawa; Shigeo Terashima, both of Nara; Taizo Sasada, Osaka, all of Japan

[73] Assignee: Sharp Kabushiki Kaisha, Osaka, Japan

[21] Appl. No.: 739,218

[22] Filed: Aug. 1, 1991

[30] Foreign Application Priority Data

Aug. 2, 1990 [JP] Japan ................................ 2-206159

[51] Int. Cl.⁵ .............................................. G11B 15/48
[52] U.S. Cl. ...................................... 360/74.1; 360/121
[58] Field of Search ................. 360/74.1, 121, 90, 93, 360/105, 134

[56] References Cited

U.S. PATENT DOCUMENTS

| | | | |
|---|---|---|---|
| 4,562,489 | 12/1985 | Gaskell et al. | 360/39 |
| 4,607,300 | 8/1986 | Aoyagi et al. | 360/74.1 |
| 4,752,850 | 6/1988 | Yamada et al. | 360/121 |
| 4,991,039 | 2/1991 | Kaku | 360/74.1 |

FOREIGN PATENT DOCUMENTS

| | | | |
|---|---|---|---|
| 278525 | 2/1988 | European Pat. Off. | G11B 23/18 |
| 2145555 | 8/1984 | United Kingdom | G11B 23/18 |

*Primary Examiner*—Paul M. Dzierzynski
*Assistant Examiner*—Richard Hanig
*Attorney, Agent, or Firm*—Birch, Stewart, Kolasch & Birch

[57] ABSTRACT

Disclosed are a magnetic recording and reproduction apparatus for a data processing unit, which includes a plurality of magnetic heads formed integrally by a thin-film forming technology, and a magnetic tape. A magnetic tape has a plurality of recording tracks corresponding to a plurality of independent data. The recording tracks are arranged in parallel to a moving direction of the magnetic tape and share the same starting position. A plurality of magnetic heads are arranged in parallel to a width direction of the magnetic tape to correspond to the recording tracks in a one-to-one correspondence, and are fixed at the starting position of the recording tracks. The magnetic tape is moved in a direction in which the starting position is away from the magnetic heads for data recording onto the magnetic tape and for data reproduction from the magnetic tape. Further, the magnetic tape is controlled to automatically and immediately move in an opposite direction to the previous direction until the starting position reaches the position of the magnetic heads in response to each of the end of the data recording and the end of the data reproduction. Thus, the starting position of the recording tracks is the same, i.e. at the position of magnetic heads upon the start of data recording and the start of data reproduction.

16 Claims, 4 Drawing Sheets

MAGNETIC RECORDING AND REPRODUCTION APPARATUS FOR DATA PROCESSING UNIT AND MAGNETIC TAPE FOR USE IN SUCH APPARATUS

BACKGROUND OF THE INVENTION

1. Field of the Invention

The present invention relates generally to magnetic recording and reproduction apparatus and magnetic tape for use in such apparatus and, more particularly, to a magnetic recording and reproduction apparatus employed as a storage apparatus requiring a faster recording function and a faster search and reproduction function, and a magnetic tape employed in such apparatus.

2. Description of the Background Art

For recording and reproducing digital data at a high speed, a hard disk, a rewritable type optical disk or the like is principally employed as a recording medium at present.

The hard disk is a magnetic disk using a disk-like aluminum substrate or glass substrate. Recording tracks of the magnetic disk are formed in a concentric form on the disk. Recording and reproduction of information for the hard disk is made by rotating the hard disk at a high speed, thereby to make magnetic heads trace on the recording tracks on the hard disk at a high speed. The rewritable type optical disk is an optical disk capable of recording and erasing data many times on the same track or the same sector. Recording tracks of the optical disk are also formed in a concentric form or spiral form on the optical disk. Recording and reproduction of information for the optical disk is made by irradiating the recording tracks of the optical disk with a laser beam while rotating the optical disk at a high speed. Optical properties of the recording layer or the rewritable type optical disk reversibly vary by irradiation with a laser beam. This enables rewriting of the information.

In general, a spindle motor is used for rotating such a disk-like recording medium as a hard disk or optical disk.

There are two types of recording and reproduction apparatus capable of recording and reproducing digital data: the one employs such a disk-like recording medium as represented by the hard disk or optical disk, and the other employs a tape-like recording medium. The recording and reproduction apparatus employing such a tape-like recording medium includes a recording and reproduction apparatus of an R-DAT system (Rotary Head Digital Audio Tape Recorder) in which data is recorded and reproduced on a magnetic tape by using a rotary head.

Figure 6:
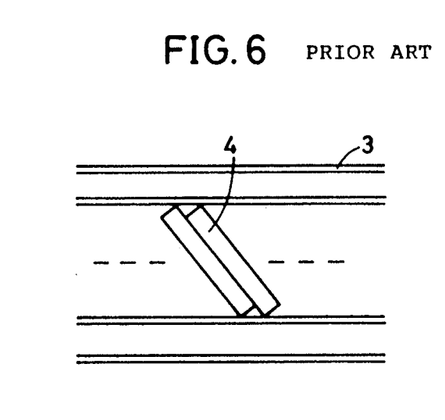
FIG. 6 is a diagram showing a tape format in accordance with a conventional R-DAT system.
Figure 7:
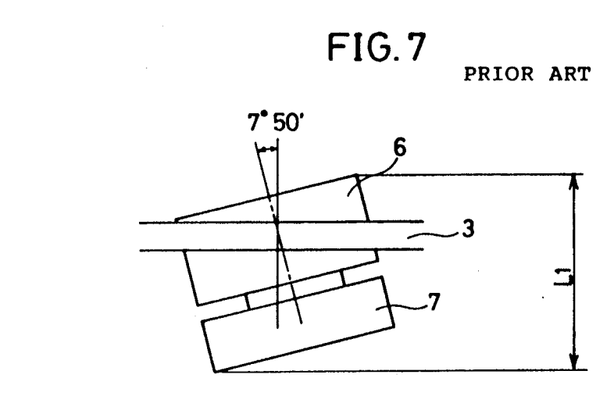
FIG. 7 is a diagram showing the state of a rotating drum in a magnetic recording and reproduction apparatus of the conventional R-DAT system.

FIG. 6 is a diagram showing a track pattern on magnetic recording by the R-DAT system. FIG. 7 is a diagram showing the state of a rotary drum system portion in the R-DAT type recording and reproduction apparatus. Referring to FIG. 7, magnetic heads (not shown) for recording and reproducing data for a magnetic tape 3 are attached on outer peripheries of a drum 6. Drum 6 is rotated at a high speed by a motor 7. Drum 6 is secured with an inclination of a definite angle (e.g., 7° 50') relative to magnetic tape 3. Magnetic tape 3 is moved in its elongated direction. With drum 6 fixed with an inclination of a definite angle to magnetic tape 3, rotation of drum 6 causes the magnetic heads attached onto drum 6 to trace on magnetic tape 3 obliquely to the moving direction of magnetic tape 3. Thus, as shown in FIG. 6, parallel recording tracks 4 inclined at a definite angle relative to the moving direction of magnetic tape 3 are formed on magnetic tape 3. In general, two magnetic heads are mounted at respective positions which are 180° apart from each other on outer peripheries of drum 6. The respective two magnetic heads have different azimuths in order to prevent occurrence of a phenomenon (cross talk) in which those magnetic heads pick up not only a signal of a recording track which is inherently to be traced but also a signal of a recording track adjacent to that recording track. Thus, the two adjacent ones of recording tracks 4 formed on magnetic tape 3 are traced by the respective magnetic heads having different azimuths.

Figure 8:
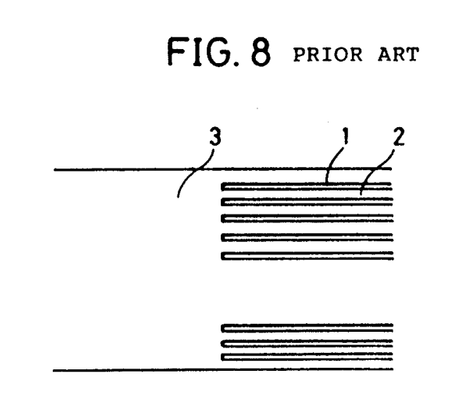
FIG. 8 is a diagram showing a tape format in accordance with a conventional S-DAT system.
Figure 9:
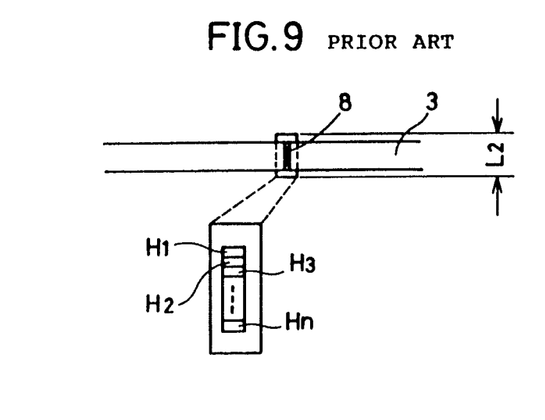
FIG. 9 is a diagram showing the state of a fixed multitrack head in an information recording and reproduction apparatus of the conventional S-DAT system.

For a recording and reproduction apparatus for recording and reproducing an audio signal as a digital signal, there is a tape recorder of an S-DAT system (Stationary Head Digital Audio Tape Recorder) in which information is recorded and reproduced on a magnetic tape by using a fixed multi track head not using a rotary head. FIG. 8 is a diagram showing a track pattern on the magnetic tape by the S-DAT system. FIG. 9 is a diagram showing a fixed multi track head portion in the tape recorder of the S-DAT system. Referring to FIG. 9, a multi track head 8 is fixed at a position facing a recording surface of a magnetic tape 3 (corresponding to the back side of the sheet of FIG. 9). Magnetic tape 3 moves in its elongated direction.

Multi track head 8 includes a plurality of magnetic heads H1, H2, ..., Hn (n is a natural number not lower than 2) arranged in parallel. The plurality of magnetic heads H1-Hn are in general thin-film heads and integrated together. The thin-film heads are magnetic heads produced by a thin-film forming technology such as sputtering, evaporation, electrodeposition or the like and an IC process technology. Each of the magnetic heads has a magnetic core and a coil wound around the magnetic core. The thin-film heads are integrally formed including smaller and planar magnetic cores and coils in the same process as that of semiconductor devices. Heads H1-Hn are arranged with a definite distance apart from each other. Thus, if magnetic tape 3 moves, then as shown in FIG. 8, recording tracks 1-1 to 1-n are formed with a definite spacing from each other on magnetic tape 3, corresponding to magnetic heads H1 to Hn. Portions 2 between any recording tracks 1-1 to 1-n, on which no information is recorded are called guards. A digital audio signal is recorded on each of recording tracks 1-1 to 1-n. A series of serial digital signals are recorded individually on recording tracks 1-1 to 1-n.

According to the S-DAT system, as described above, information is recorded in parallel on magnetic tape 3 separately for a plurality of channels. With multi track head 8 formed of the thin-film heads, each of heads H1-Hn can be reduced in scale. This entails reductions in the width of each of recording tracks 1-1 to 1-n and the width of each of guards 2. Thus, the number of channels in a single magnetic tape, i.e., the number of recording tracks formed in parallel to the moving direction of magnetic tape 3 can be increased with the reduction in the scale of heads H1-Hn. For example, a tape recorder of the S-DAT system in which recording tracks of 20 channels or so are formed on a magnetic tape having a width of 3.81 mm is implemented for practical use at present.

In the case where each of sampled audio signal voltages is converted to 16-bit digital data when an analog audio signal is digitized in recording onto a magnetic tape, for example, if the number of channels of the magnetic tape is 16, then a digital audio signal is recorded on the magnetic tape so the data of respective ones of 16 bits may correspond to respective ones of recording tracks of the magnetic tape in a one-to-one correspondence. More specifically, digital signals indicating the sampled audio signal voltages are allotted to 16 channels for respective bits and recorded time-sequentially. Accordingly, the digital audio signal is recorded in parallel to the moving direction of the magnetic tape in real time.

As described above, the recording and reproduction apparatus using the disk as a recording medium has been mainly applied as a conventional recording and reproduction apparatus requiring a faster recording and a faster search and reproduction. This results from the following reasons.

When a disk is used as a recording medium, recording tracks are formed in the form of a concentric circle about the center of the disk, on a recording surface of the disk. Recording and reproduction of information for the disk is carried out, with a head supporter called an "arm" which has a head mounted on its tip end being moved in a radial direction of the disk. Thus, in order to search for necessary information from the disk, it is necessary to move the arm in the radial direction of the disk to find out recording/reproduction tracks on which the necessary information is recorded/reproduced. Thus, since the movement of the arm for searching for the information is not larger than the radius of the disk, the information is searched for at a relatively high speed.

On the other hand, when a magnetic tape is used as a recording medium, recording tracks are formed in parallel to the moving direction of the magnetic tape by a fixed head in accordance with the S-DAT system. Information is then recorded time-sequentially on the recording tracks. Thus, in order to search for necessary information from the magnetic tape, it is necessary to fast forward or rewind the magnetic tape to move a portion of the recording tracks, on which the necessary information is recorded, to the position of the fixed head. Therefore, a maximum value of the forwarding or the rewinding of the magnetic tape required for the search for the information is equal to the total length of the magnetic tape. It is thus relatively difficult to search for the necessary information from the magnetic tape at a high speed. For the same reason, it is more advantageous to use the disk as a recording medium than the magnetic tape in recording information at a desired position on the recording tracks at a high speed.

As described above, if the disk is employed as a recording medium, the head can be moved to an arbitrary recording track, skipping any recording tracks interposed therebetween only moving the arm in the range of a short distance, thereby enabling a faster recording and a faster search and reproduction.

There is also an R-DAT system for the magnetic tape recording system. In the R-DAT system, however, a plurality of recording tracks are formed obliquely to the moving direction of the magnetic tape. Thus, if a single head is mounted on a rotating drum, a second recording track does not start to be traced soon after a first one recording track is traced. More specifically, a definite time period corresponding to rotating speed of the drum is provided between time that the head reaches a tracing end position of the first recording track and time that the head reaches a tracing start position of the second recording track. Thus, information recorded on each of the recording tracks is liable to be discontinuous at junctions of the recording tracks. In order to decrease such a phenomenon, a plurality of heads are mounted on the drum, thereby reducing the period between the time that one recording track is traced and the time that the next recording track starts to be traced. However, also in the R-DAT system, information is recorded time-sequentially in accordance with the moving direction of the magnetic tape, and hence it is difficult to realize a faster recording and a faster search and reproduction.

For the above reasons, a disk is often employed as a recording medium in a recording and reproduction apparatus used for information processing such as a computer. Under such circumstances, a still larger recording capacity and a still faster access function have recently been required for a recording and reproduction apparatus for use in equipment having an information processing function.

In order to increase a storage capacity of the disk, it is necessary to increase a radius of the disk to increase the number of recording tracks. However, it is impossible for practical use to infinitely increase the radius of the disk. Thus, there is inevitably a limitation in the increase in the recording capacity of the recording and reproduction apparatus using the disk as a recording medium. On the other hand, in order to increase the capacity of the recording and reproduction apparatus using a magnetic tape as a recording medium, it is necessary to increase the length of the magnetic tape. Necessary alteration for the recording and reproduction apparatus in accordance with a change in the length of the magnetic tape is made with only respect to the size of a cartridge for use to lap the magnetic tape. Thus, the recording capacity of the recording and reproduction apparatus using the magnetic tape as a recording medium can be increased relatively easily without being limited for practical use as compared to the recording capacity of the recording and reproduction apparatus using the disk as a recording medium. That is, with regard to an improvement in recording capacity, it is more advantageous to use the magnetic tape as a recording medium.

As equipment having the information processing function becomes smaller and more portable, a lighter and smaller recording and reproduction apparatus is required for use in such equipment. As mentioned before, when a disk is used as a recording medium, a spindle motor for rotating the disk is necessary. In addition, the recording and reproduction apparatus of the R-DAT system using a rotary head requires a motor for rotating a drum on which a head is mounted (motor 7 of FIG. 7). Thus, the recording and reproduction apparatus using the disk as a recording medium cannot be designed in such a thin form that the height of the apparatus is lower than the height of the spindle motor. Similarly, with reference to FIG. 7, the recording and reproduction apparatus of the R-DAT system cannot be made thinner than the sum of L1 of the height of drum 6 and the height of motor 7 for rotating drum 6. That is, there is inevitably a limitation in reduction in the scale of the recording and reproduction apparatus. On the other hand, the recording and reproduction apparatus of the S-DAT system using a fixed head does not require such a motor as described above and hence, with reference to FIG. 9, the apparatus can be designed as thin as approximately the width L2 of head 8. Therefore, with regard to the reduction in the scale of the apparatus, the recording and reproduction apparatus of the S-DAT system is more advantageous than the apparatus of the R-DAT system. However, the recording and reproduction apparatus using the magnetic tape as a recording medium is disadvantageous in respect of the faster recording and the faster search and reproduction as mentioned above.

SUMMARY OF THE INVENTION

One object of the present invention is to provide a magnetic recording and reproduction apparatus for a data processing unit, capable of recording a large amount of data on a recording medium at a high speed.

Another object of the present invention is to provide a magnetic recording and reproduction apparatus for a data processing unit, capable of searching for desired data from a recording medium at a high speed and reproducing the desired data.

A further object of the present invention is to provide a magnetic recording and reproduction apparatus for a data processing unit, which can be reduced in scale and weight.

A still further object of the present invention is to provide a magnetic recording and reproduction apparatus for a data processing unit, the storage capacity of which can be increased without so many variations variance in the structure of the apparatus.

A still further object of the present invention is to provide a magnetic recording and reproduction apparatus for a data processing unit, which can achieve a faster recording and a faster search and reproduction and can be reduced in scale and increased in storage capacity, and a magnetic tape for use in such a magnetic recording and reproduction apparatus.

In order to accomplish the above objects, a magnetic recording and reproduction apparatus according to the present invention includes a plurality of magnetic heads fixed at the same position and for recording a plurality of independent data on a magnetic tape in parallel. The plurality of magnetic heads are arranged in parallel to a width direction of the magnetic tape. A plurality of recording tracks which are provided in parallel to a moving direction of the magnetic tape and share the same starting position are provided on the magnetic tape one for each of the plurality of magnetic heads. The plurality of independent data are correspondent to the plurality of recording tracks in a one-to-one correspondence. The magnetic recording and reproduction apparatus according to the present invention further includes tape drive means responsive to the end of recording and the end of reproduction for immediately translating the magnetic tape until the plurality of magnetic heads reach the starting position of the plurality of recording tracks.

As mentioned above, the magnetic recording and reproduction apparatus according to the present invention is structured such that the magnetic heads are fixed and the recording tracks are traced by moving the magnetic tape. It is thus unnecessary to rotate the magnetic heads and the recording medium at a high speed. Further, the plurality of independent data are recorded individually on the plurality of recording tracks sharing the same starting position. Since the magnetic recording and reproduction apparatus according to the present invention includes the above-described tape moving means, the starting position of the plurality of recording tracks is returned to the position of the plurality of magnetic heads at immediately the end of recording and at the time of the end of reproduction. Accordingly, each of the magnetic heads is always at the starting position of its corresponding recording track at the time of the start of recording and at the time of the start of reproduction. Thus, the respective magnetic heads immediately start tracing their corresponding recording tracks from the starting position at the time of recording and at the time of reproduction. More specifically, the plurality of independent data immediately start to be recorded on the corresponding recording tracks at the time of recording, while the plurality of independent data recorded on the plurality of recording tracks immediately and simultaneously start to be reproduced at the time of reproduction.

In accordance with another aspect, a method of operating a magnetic recording and reproduction apparatus according to the present invention includes the steps of: locating a plurality of magnetic heads for recording/reproducing a plurality of independent data on a magnetic tape at a predetermined position of the magnetic tape and in parallel to a width direction of the magnetic tape; translating the magnetic tape in a predetermined direction for recording and reproduction; and immediately translating the magnetic tape so that the predetermined position on the magnetic tape returns to the position of the plurality of magnetic heads in response to the end of the recording and the end of the reproduction.

According to a preferred embodiment, each of the plurality of magnetic heads is a thin-film head, and each of the plurality of recording tracks includes a first area in which corresponding data of the plurality of independent data is to be recorded, and a second area in which necessary information for searching for the corresponding data from the magnetic tape is to be recorded.

Thus, according to the present invention, a thin magnetic recording and reproduction apparatus having a larger recording capacity and a faster recording/reproducing function and a faster search function is provided.

The foregoing and other objects, features, aspects and advantages of the present invention will become more apparent from the following detailed description of the present invention when taken in conjunction with the

DESCRIPTION OF THE PREFERRED EMBODIMENTS

Figure 1:
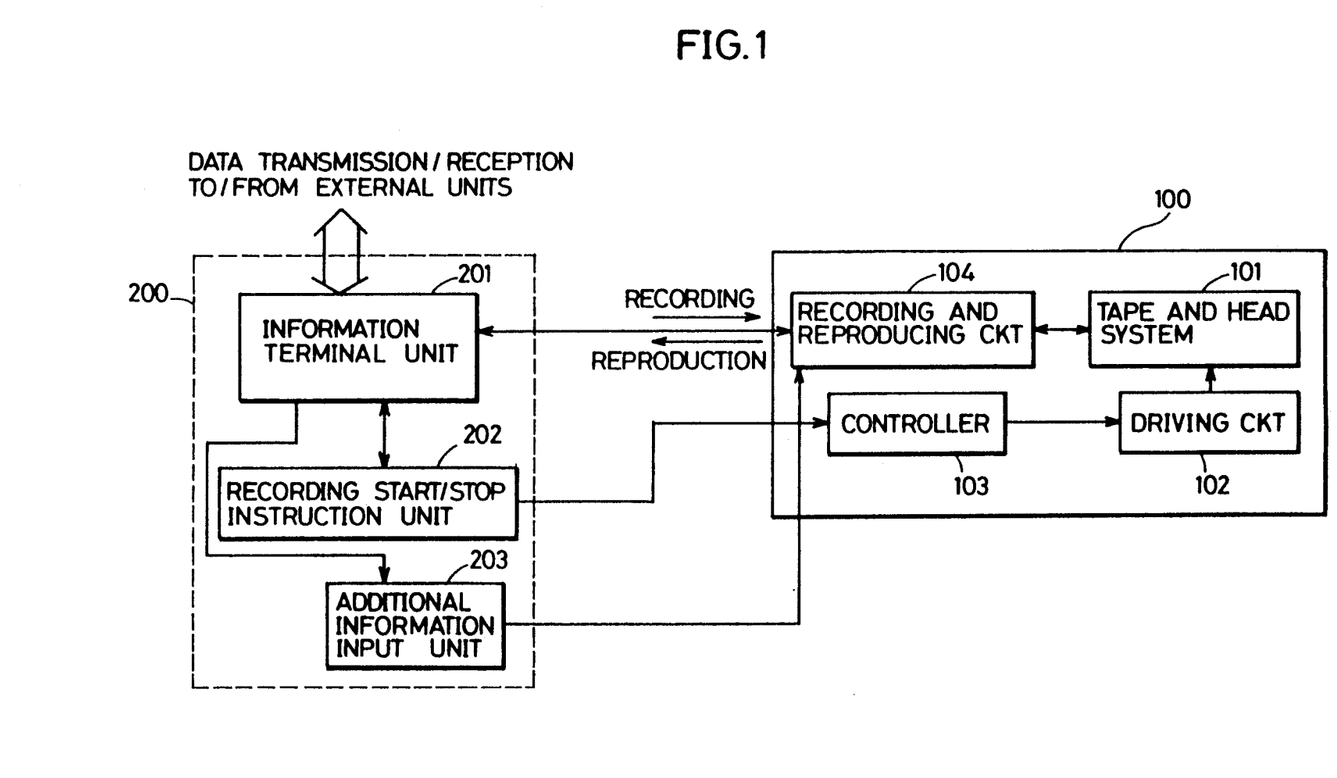
FIG. 1 is a schematic block diagram showing structure of an information recording and reproduction apparatus according to one embodiment of the present invention.

FIG. 1 is a schematic block diagram showing an information recording and reproduction apparatus of one embodiment of the present invention. FIG. 1 illustrates the case where this information recording and reproduction apparatus is used in equipment having an information processing function such as copiers, word processors, personal computers, facsimile devices or the like.

Referring to FIG. 1, this information recording and reproduction apparatus 100 includes a tape and head system 101, a driving circuit 102 for driving tape and head system 101, a controller 103 for controlling driving circuit 102, and a recording and reproducing circuit 104.

Tape and head system 101 has a structure implemented by the S-DAT system conventionally used in audio tape recorders. More specifically, tape and head system 101 includes a magnetic tape (not shown) and a fixed multi track head (not shown). Referring to FIG. 9, fixed multi track head 8 is fixed at a position facing a recording surface of moving magnetic tape 3. Since fixed multi track head 8 includes a plurality of magnetic heads Hl-Hn formed integrally as thin-film heads, when magnetic tape 3 moves, n-channel recording tracks 1-1 to 1-n are formed in a moving direction of magnetic tape 3, as shown in FIG. 8. In the information recording and reproduction apparatus of this embodiment, however, unlike the magnetic recording and reproduction apparatus of the conventional S-DAT system, a tracing start position and a tracing end position on recording tracks 1-1 to 1-n on magnetic tape 3 at the time of recording and reproduction ar settled in advance. The tracing start position is common to all recording tracks 1-1 to 1-n. The tracing end position is determined depending on the amount of information to be recorded on each of recording tracks 1-1 to 1-n.

Data applied from apparatus (hereinafter referred to as information processing apparatus) 200 such as copiers, word processors, personal computers, facsimile devices or the like to information recording and reproduction apparatus 100 are recorded individually for n recording tracks 1-1 to 1-n on magnetic tape 3 of tape and head system 101. More specifically, output data of information processing apparatus 200 are applied, for example, dependently on their types to respective ones of magnetic heads Hl-Hn. Accordingly, respective data of the same type are recorded on the respective ones of recording tracks 1-1 to 1-n.

Figure 2:
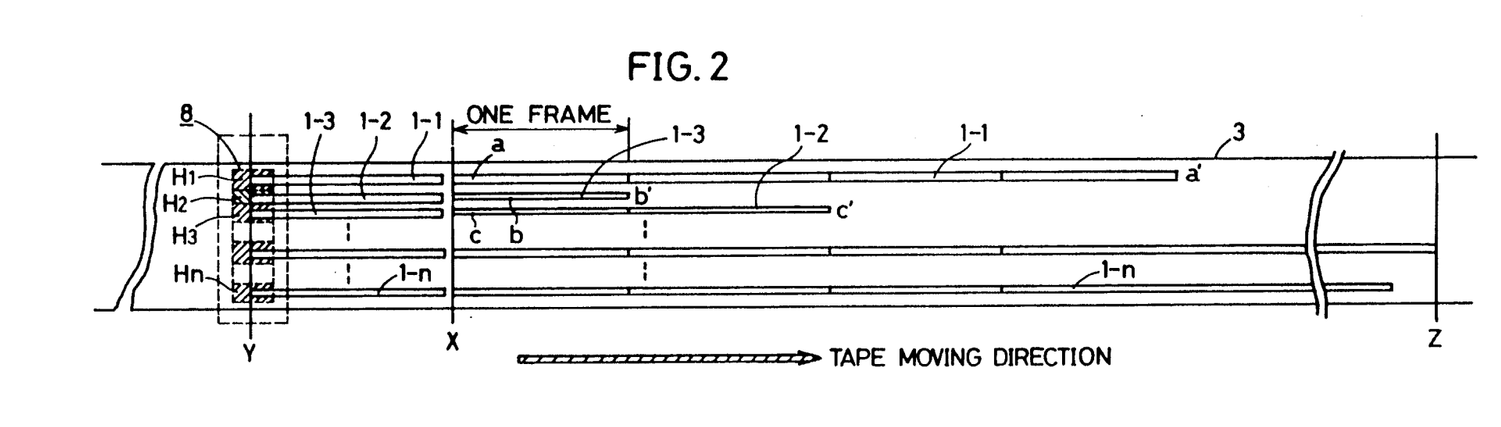
FIG. 2 is a diagram showing a tape format of a magnetic tape in the information recording and reproduction apparatus according to the above embodiment.

FIG. 2 is a diagram showing a tape format of a magnetic tape in the information recording and reproduction apparatus of this embodiment. Referring to FIG. 2, in magnetic tape 3, a right-hand part to a position X is an area in which the output data of information processing apparatus 200 are to be recorded, and the area between position X and a position Y is an area in which additional information, such as a recording address, an address of a recording end position and a unit number of the data recorded on the right-hand area to position X, are to be recorded.

A certain type of data of the output data of information processing apparatus 200 is recorded on the area between a position a and a position a' on recording track 1-1. Another type of data of the output data of information processing apparatus 200 is recorded on the area between positions b and b' on recording track 1-2. Still another type of data of the output data is recorded on the area between positions c and c' on recording track 1-3. Similarly, data are each recorded on each of recording tracks 1-4 to 1-n. A recording start position of the data on recording tracks 1-1 to 1-n is the same position Y.

Figure 3:
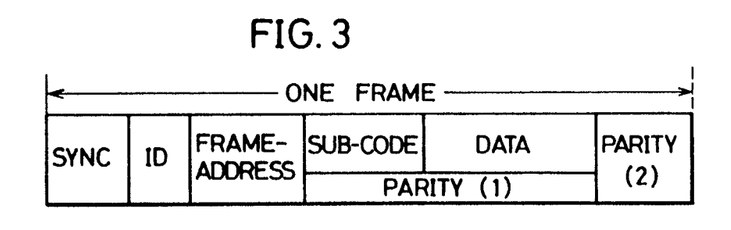
FIG. 3 is a diagram showing one example of structure of data to be recorded in the information recording and reproduction apparatus according to the above embodiment.

The data to be recorded in each of recording tracks 1-1 to 1-n is formed of one or a plurality of basic units each called "frame". The data of each frame is structured in accordance with the conventional S-DAT system as shown in, for example, FIG. 3. FIG. 3 is a diagram showing what information is included in one frame. Referring to FIG. 3, each frame is comprised of a data SYNC portion corresponding to a synchronizing signal for making accurate recording and reproduction, a data ID portion corresponding to information (address information) indicating what position on magnetic tape 3 data is recorded, a data FRAME-ADDRESS portion corresponding to information (frame address information) indicating what order is the corresponding frame out of the frames constituting a series of data, a data SUB-CODE portion corresponding to index information such as the title of information to inherently be recorded, a data DATA portion corresponding to information to inherently be recorded, and a portion PARITY (2) corresponding to a parity bit for checking if there is any error in each bit of those data. To the data portions SUB-CODE and DATA corresponding to the information to inherently be recorded, a parity bit PARITY (1) for checking if there is any error in each bit of these data portions is added.

On recording track 1-1 in the area X-Y on magnetic tape 3, such information are recorded that how many frames of data are recorded on recording track 1-1 in the right hand area to position X (a unit number of recorded information), what area of recording track 1-1 the data are recorded in (a recording address), what position on recording track 1-1 the data are recorded to (an address of a recording end position), and the like. Such information as a recording address of data, an address of a data recording end position, a unit number of recorded data and the like with respect to recording track 1-2 on the right hand of position X are recorded on recording track 1-2 in the area X-Y. In other recording tracks 1-3 to 1-n in the area X-Y also, the above-described additional information with respect to recorded data of corresponding recording tracks 1-3 to 1-n on the right hand of position X are recorded, respectively With reference again to FIG. 1, information processing apparatus 200 includes an information terminal unit 201, a recording start/stop instruction unit 202, and an additional information input unit 203. Information terminal unit 201 externally receives and transmits data. In a word processor, a personal computer or the like, information terminal unit 201 includes a display and a keyboard. User can input or retrieve desired data by operating the display and the keyboard. More specifically, information terminal unit 201 controls information recording and reproduction apparatus 100 in accordance with an externally applied request of recording input data, an externally applied request of retrieving recorded data, or the like.

For example, in order that data externally accepted by information terminal unit 201 are recorded, information terminal unit 201 converts data to be recorded into digital signals for recording which have such structure as shown in FIG. 3 for each predetermined bit length, and applies the converted signals to recording and reproducing circuit 104 in information recording and reproduction apparatus 100. Further, information terminal unit 201 outputs a control signal instructing the start of data recording to recording start/stop instruction unit 202, and also applies the above-described additional information to additional information input unit 203. Recording start/stop instruction unit 202 responds to the control signal from information terminal unit 201 to apply a control signal instructing the start of driving tape and head system 101 to controller 103 in information recording and reproduction apparatus 100. In response to the application of the control signal, controller 103 carries out a control operation for data recording for driving circuit 102. Driving circuit 102 is controlled by controller 103 to move a magnetic tape in tape and head system 101 in the arrowed direction in FIG. 2 at a definite speed. Additional information input unit 203 converts the additional information applied from information terminal unit 201 into digital signals for recording of a predetermined format and outputs the converted signals. Recording and reproducing circuit 104 in information recording and reproduction apparatus 100 converts the respective digital signals output from additional information input unit 203 and from information terminal unit 201 in a signal format conforming to the recording onto the magnetic tape and applies the converted signals to fixed multi track head 8 of tape and head system 101.

More specifically, with reference to FIG. 2, during the period for which the area X-Y on magnetic tape 3 moves on fixed multi track head 8, recording and reproducing circuit 104 changes the direction of a current flowing through coils of at least one magnetic head of magnetic heads H1-Hn constituting fixed multi track head 8 in correspondence with a logic value "0" or "1" indicated by the digital signal from additional information input unit 203. During the period for which the right-hand area to position X on magnetic tape 3 moves on fixed multi track head 8, recording and reproducing circuit 104 changes the direction of a current flowing through coils of the magnetic head of magnetic heads H1-Hn in correspondence with a logic value "0" or "1" indicated by the recording digital signal from information terminal unit 201.

It is predetermined what type of information is recorded on each of recording tracks 1-1 to 1-n on magnetic tape 3. Information terminal unit 201 divides information to be recorded on magnetic tape 3 into information to be recorded on recording track 1-1, information to be recorded on recording track 1-2, ..., information to be recorded on recording track 1-n in accordance with a correspondence of recording tracks 1-1 to 1-n to the types of the information to be recorded thereon, and then applies the divided information in parallel as digital signals to recording and reproducing circuit 104.

Similarly, additional information input unit 203 divides the additional information applied from information terminal unit 201 into the respective information to be recorded on respective recording tracks 1-1 to 1-n, and then applies the divided information in parallel as digital signals to recording and reproducing circuit 104. Recording and reproducing circuit 104 causes a current for recording to flow through coils of any ones of magnetic heads H1-Hn tracing any ones of recording tracks 1-1 to 1-n on which corresponding ones of the digital signals are to be recorded. Consequently, the information are recorded on magnetic tape 3 in the tape format shown in FIG. 2.

After outputting all the information to be recorded on magnetic tape 3, information terminal unit 201 outputs a control signal instructing the end of data recording to recording start/stop instruction unit 202. In response to the application of the control signal, recording start/stop instruction unit 202 applies a signal instructing the stop of the data recording operation of tape and head system 101 to controller 103 in recording and reproducing circuit 104. In response to the application of the signal, controller 103 stops the data recording operation of tape and head system 101 and controls driving circuit 102 so that tape and head system 101 may be forced in a predetermined state (hereinafter referred to as the initial state) which is an inherent state of tape and head system 101 at the time of the start of recording and at the time of the start of reproducing.

More specifically, driving circuit 102 is controlled by controller 103 to stop the movement of magnetic tape 3 of tape and head system 101 in the arrowed direction in FIG. 2. Then, driving circuit 102 moves magnetic tape 3 in the opposite direction to the arrowed direction in FIG. 2 and, at the time point when recording start position Y of the additional information in FIG. 2 reaches on fixed multi track head 8, driving circuit 102 stops the movement of magnetic tape 3. That is, fixed multi track head 8 is at recording start position Y on magnetic tape 3 in the initial state.

After that, if there is any externally applied new request of recording input data in information processing apparatus 200, then information terminal unit 201 operates again as in the above-described manner. Thus, magnetic tape 3 of tape and head system 101 is moved again in the arrowed direction in FIG. 2 by driving circuit 102 in information recording and reproduction apparatus 100. Now, fixed multi track head 8 is at recording start position Y of magnetic tape 3 in the initial state. Thus, if magnetic tape 3 is moved in the arrowed direction, then fixed multi track head 8 immediately starts tracing magnetic tape 3 from recording start position Y. Accordingly, the respective digital signals applied from additional information terminal 201 and from additional information input unit 203 to recording and reproducing circuit 104 may be applied to tape and head system 101 without waiting for the recording area on magnetic tape 3 to reach on fixed multi track head 8. That is, the data recording onto magnetic tape 3 is started in quick response to the input data recording request to information terminal unit 201. This makes it possible to record the information on magnetic tape 3 at a high speed. If all the data provided with recording requests are output from information terminal unit 201 and all the data provided with recording requests are recorded on magnetic tape 3, then magnetic tape 3 is again rewound until recording start position Y reaches fixed multi track head 8.

If there is any externally applied request of data retrieval in information terminal unit 201, then information recording and reproduction apparatus 100 is controlled by information processing apparatus 200 to operate so as to reproduce the data recorded on magnetic tape 3 as described above.

More specifically, information terminal unit 201 responds to the externally applied data retrieval request to output a control signal instructing the start of reproducing data to recording start/stop instruction unit 202. Recording start/stop instruction unit 202 responds to this control signal to apply a signal instructing the start of a reproducing operation of tape and head system 101 to controller 103 in information recording and reproduction apparatus 100. Controller 103 responds to this instruction signal to control driving circuit 102 to cause the reproducing operation of tape and head system 101. Driving circuit 102 is controlled by controller 103 to move magnetic tape 3 of tape and head system 101 in the arrowed direction in FIG. 2 at a definite speed.

Since fixed multi track head 8 is now at recording start position Y on magnetic tape 3 in the initial state, when magnetic tape 3 starts moving, fixed multi track head 8 starts tracing magnetic tape 3 from recording start position Y. Accordingly, electromotive forces having respective polarities corresponding to the respective data recorded on corresponding recording tracks 1-1 to 1-n immediately start to be induced in the respective coils of magnetic heads Hl-Hn. That is, data reproduction from magnetic tape 3 is started in quick response to the data retrieval request to information terminal unit 201. The electromotive forces induced in the respective coils of magnetic heads Hl-Hn are converted into digital signals in the same format as the one provided prior to the recording by recording and reproducing circuit 104 and are then applied to information terminal unit 201. Information terminal unit 201 displays the information represented by the digital signals applied from recording and reproducing circuit 104, in a form which is recognizable by the eye of user, on an indicating portion such as a display.

If the movement of magnetic tape 3 is terminated until a final position Z of the area where data is recorded reaches the position of fixed multi track head 8, i.e., all the data recorded on magnetic tape 3 are reproduced, then electromotive forces of polarities corresponding to the data are not subsequently induced in any coils of magnetic heads Hl-Hn. Thus, data are no longer output from recording and reproducing circuit 104. Information terminal unit 201 responds to the nonapplication of the data from recording and reproducing circuit 104 to apply a control signal instructing the end of data reproduction to recording start/stop instruction unit 202. In response to the application of the control signal, recording start/stop instruction unit 202 instructs the end of the reproducing operation of tape and head system 101 to controller 103 in information recording and reproduction apparatus 100. Controller 103 responds to this instruction to operate in the same manner as at the time of the end of data recording. More specifically, controller 103 controls driving circuit 102 so that the state of tape and head system 101 returns to the initial state. Driving circuit 102 is controlled by controller 103 to rewind magnetic tape 3 of tape and head system 101 until recording start position Y reaches the position of fixed multi track head 8, and then stop magnetic tape 3.

Recording start/stop instruction unit 202 responds to controller 103 in information recording and reproduction apparatus 100 having started or stopped a predetermined control operation for data recording and data reproduction, to instruct the output of data to be recorded in information terminal unit 201, the acceptance of reproduction data output from information recording and reproduction apparatus 100, and the like.

As described above, in order that fixed multi track head 8 is at recording start position Y on magnetic tape 3 at the time of the start of recording and at the time of the start of reproduction, information recording and reproduction apparatus 100 of this embodiment operates to rewind magnetic tape 3 so that recording start position Y absolutely returns to the position of fixed multi track head 8 after the end of data recording onto magnetic tape 3 and after the end of data reproduction from magnetic tape 3. Thus, if the movement of magnetic tape 3 is started at the time of data recording and at the time of data reproduction, data recording and data reproduction can immediately be carried out. Consequently, the time period between time that user instructs information processing apparatus 200 to record input data and time that the data is actually started to be recorded on magnetic tape 3 of information recording and reproduction apparatus 100, and the time period between time that the user instructs information processing apparatus 200 to retrieve the recorded information and time that the data is actually started to be reproduced from magnetic tape 3 of information recording and reproduction apparatus 100 are substantially reduced as compared to the case where the conventional magnetic recording and reproduction apparatus of the S-DAT system, in which a recording start position is an arbitrary position on magnetic tape 3, is employed as information recording and reproduction apparatus 100.

In addition, in information recording and reproduction apparatus 100 of this embodiment, the data applied from information terminal unit 201 are allotted to the plurality of recording tracks 1-1 to 1-n formed in parallel to the moving direction of magnetic tape 3 and then recorded. This makes it possible to simultaneously record maximal n types of information on magnetic tape 3 and also simultaneously read the maximal n types of information from magnetic tape 3. Consequently, the time period between time that data are started to be recorded on magnetic tape 3 and time that all the data to be recorded are completed to be recorded on magnetic tape 3, and the time period between time that data are started to be reproduced from magnetic tape 3 and time that all the data recorded on magnetic tape 3 are completed to be reproduced are substantially reduced as compared to the case where the magnetic recording and reproduction apparatus of the R-DAT system, in which data are serially recorded on a plurality of tracks formed obliquely to the moving direction of magnetic tape 3, is employed as information recording and reproduction apparatus 100.

As described above, in information recording and reproduction apparatus 100 of this embodiment, timing that data recording/reproduction for a recording medium is started in accordance with a data retrieval request and a data recording request to information processing apparatus 200 becomes faster, and actual data recording time and actual data reproduction time also become shorter. This results in achievement of a faster recording and a faster reproduction which have been hardly achieved in the conventional magnetic recording and reproduction apparatus using the magnetic tape as a recording medium.

It is assumed, for example, that the amount of the longest-bit information out of plural types of information applied in parallel as record data to information recording and reproduction apparatus 100 by information processing apparatus 200 is 2MB. A length required for magnetic tape 3 being the recording medium of information recording and reproduction apparatus 100 is a length required for a recording track on which the longest-bit information is to be recorded out of recording tracks 1-1 to 1-n of magnetic tape 3. Accordingly, the length required for magnetic tape 3 is the length of the magnetic tape required when 2MB information are serially recorded on a single recording track formed in parallel to the moving direction of the magnetic tape. At present, a sufficient length of the magnetic tape is 8 m for serially recording the information amount of 2MB in parallel to the moving direction of magnetic tape 3. Thus, the sufficient length of the magnetic tape to be employed as the recording medium of information recording and reproduction apparatus 100 in that case is 8 m.

According to the present technology, even if the magnetic tape is moved at a speed as high as approximately 3 m/sec, appropriate data recording and reproduction for the magnetic tape can be made. Therefore, if magnetic tape 3 is moved at, e.g., 3 m/sec, the time period required for the fixed multi track head to trace all of magnetic tape 3 is 2.6 sec ($\approx 8$ m/3 m) wherein the length of magnetic tape 3 is 8 m and the recording start position is an end of magnetic tape 3. That is, the information amount of 2MB are completed to be recorded or reproduced in only 2.6 sec. The information amount of 2MB is approximately equal to an information amount that can be recorded on a floppy disk of 3.5 inch in size.

The total amount of image information such as letters or characters written on a sheet of an A4 size is approximately 3KB when such image information are coded. As has been mentioned above, a required length of the magnetic tape is approximately 8 m when the information amount of 2MB are serially recorded on a single recording track parallel to the moving direction of the magnetic tape. Thus, the length of magnetic tape 3 may be approximately 12 mm in order to record all the information amount of 3KB on any one of recording tracks 1-1 to 1-n of magnetic tape 3. Accordingly, a time period required to record all the information amount of 3KB on magnetic tape 3 or a time period required to reproduce all the 3KB information amount from magnetic tape 3 is 4 msec ($=12 \times 10$ m/3 m). For example, a facsimile device reads images such as of letters or characters written on a printing medium such as paper, codes information of the read images, once stores the coded image information therein, then reads and outputs the same as image information to be transferred to a communication line. Therefore, the facsimile device requires an information recording and reproduction apparatus for recording and reproducing the coded data. Thus, if information recording and reproduction apparatus 100 of this embodiment is applied to that of the facsimile device, image information of one page of the A4 size sheet, for example, can be completed to be recorded or reproduced in only 4 msec. Consequently, the time period between time that the image information to be transferred is applied to the facsimile device and time that the image information is actually output to the communication line is shortened, resulting in a faster operation of the facsimile device.

In this embodiment, an additional information recording area Y-X in which a recording address of data, an address of a data recording end position, a unit number of recorded data, and the like are recorded is provided in the left-hand area to the area for information to inherently be recorded (the right-hand area to position X in FIG. 2). Magnetic tape 3 is attached to, for example, a cassette as in the same manner as in the conventional. Replacement of a recording medium is made by replacing this cassette by another cassette, if necessary. Thus, if the above-described additional information recording area is provided on the magnetic tape, an information amount and information contents recorded on the magnetic tape used as the recording medium, and information as to the absence or presence of any used recording track can be obtained in advance at the time of insertion of the tape cassette in apparatus 100. More specifically, information recording and reproduction apparatus 100 may be structured such that if the tape cassette is inserted in apparatus 100 in use of apparatus 100, recording and reproducing circuit 104 and driving circuit 102 automatically operate to read data from the additional information recording area on the magnetic tape attached to the tape cassette. Such a structure has already been common in CD (Compact Disk) players or the like.

The additional information read automatically at the time of inserting the tape cassette is applied to information terminal unit 201 in FIG. 1. Information terminal unit 201 determines on the basis of the applied additional information as to which track on the magnetic tape of information recording and reproduction apparatus 100 a subsequent recording and reproduction should be made for. Information recording and reproduction apparatus 100 carries out data recording and data reproduction in accordance with such a determination.

In this embodiment, different types of information are recorded on respective recording tracks 1-1 to 1-n on magnetic tape 3 being the recording medium in information recording and reproduction apparatus 100. Accordingly, if data indicating the types of the information recorded on respective recording tracks 1-1 to 1-n in the right-hand area to position X are recorded in advance as additional information in additional information recording area Y-X on magnetic tape 3, then it can be informed what information has been recorded in each of the recording tracks on magnetic tape 3 prior to data recording/reproduction onto/from magnetic tape 3. Thus, when a desired type of information is searched out of all the information recorded on magnetic tape 3, information terminal unit 201 may selectively accept data reproduced from any one of recording tracks 1-1 to 1-n, in which the desired type of information is recorded, out of reproduction data applied in parallel from information recording and reproduction apparatus 100, on the basis of the additional information obtained at the time of inserting the tape cassette. More specifically, in information recording and reproduction apparatus 100 of this embodiment unlike the conventional magnetic recording and reproduction apparatus, since the data recorded on magnetic tape 3 are reproduced in parallel and dependently on types at the time of reproduction, in order to search for desired data, it is unnecessary to vainly move magnetic tape 3 until the magnetic head reaches the area where the desired type of data is recorded, in order to search for desired data. Thus, the desired data can be searched and reproduced from magnetic tape 3 at a higher speed than in the conventional.

In the foregoing embodiment, the magnetic tape is moved in only one direction so that the recording tracks may extend only in one direction from a predetermined position Y on the magnetic tape. Thus, a maximum value of the types of information that can be recorded on a single magnetic tape is limited to a maximum value of the recording tracks that can be formed in parallel to the moving direction of the single magnetic tape. The number of the recording tracks that can be formed in parallel to the moving direction of the magnetic tape is defined by respective widths of respective magnetic heads Hl-Hn constituting fixed multi track head 8 tracing this magnetic tape. As the respective widths of magnetic heads Hl-Hn become decreased, the number of the recording tracks that can be formed on the magnetic tape becomes increased. Recently, the respective widths of magnetic heads Hl-Hn can be significantly reduced by employing thin-film heads for magnetic heads Hl-Hn. However, a lower limit of the size of a thin-film head that can be applied for practical use is a certain finite value.

In addition, as the distance between any magnetic heads Hl-Hn (a head spacing) becomes decreased, the widths of guards 2 (see FIG. 8) become decreased, and hence the number of the recording tracks that can be formed on the magnetic tape becomes increased. However, the widths of guards 2 must not be set to excessively low values in order to record data in the respective recording tracks without affecting adjacent recording tracks and to reproduce data from the respective recording tracks without being affected by the adjacent recording tracks. Particularly, as a magnetic tape having a smaller width (e.g., 3.81 mm) is employed, it becomes important to maintain a sufficient head spacing in order to achieve an excellent recording and reproduction. Therefore, when a magnetic tape with a small width is employed, an upper limit of the number of recording tracks that can be formed on that magnetic tape is limited in a relatively narrow range by head spacings and head widths. In other words, the number of the types of information that can be recorded on the magnetic tape cannot be increased to a large extent.

A fixed multi track head is used in the information recording and reproduction apparatus of the foregoing embodiment. Thus, the thickness of the main body of the information recording and reproduction apparatus of the foregoing embodiment can be reduced to width L2 or so of fixed multi track head 8 (see FIG. 9). Accordingly, if the information recording and reproduction apparatus of the foregoing embodiment is incorporated in information processing apparatus such as a copier, facsimile device, word processor or personal computer, this information processing apparatus can be made thinner. Width L2 of fixed multi track head 8 must conform to the width of magnetic tape 3 in use. Thus, the use of a magnetic tape with a large width means an increase in the width of the fixed multi track head. Therefore, a magnetic tape for use has preferably a smaller width for making the information recording and reproduction apparatus of the foregoing embodiment still thinner. However, as described above, if the width of the magnetic tape is small, the upper limit of the number of recording tracks that can be formed on the magnetic tape is limited to some extent, and hence many types of information cannot be recorded.

Thus, the following method may be adopted in order to increase the types of recordable information without increasing the width of the magnetic tape.

Figure 4:
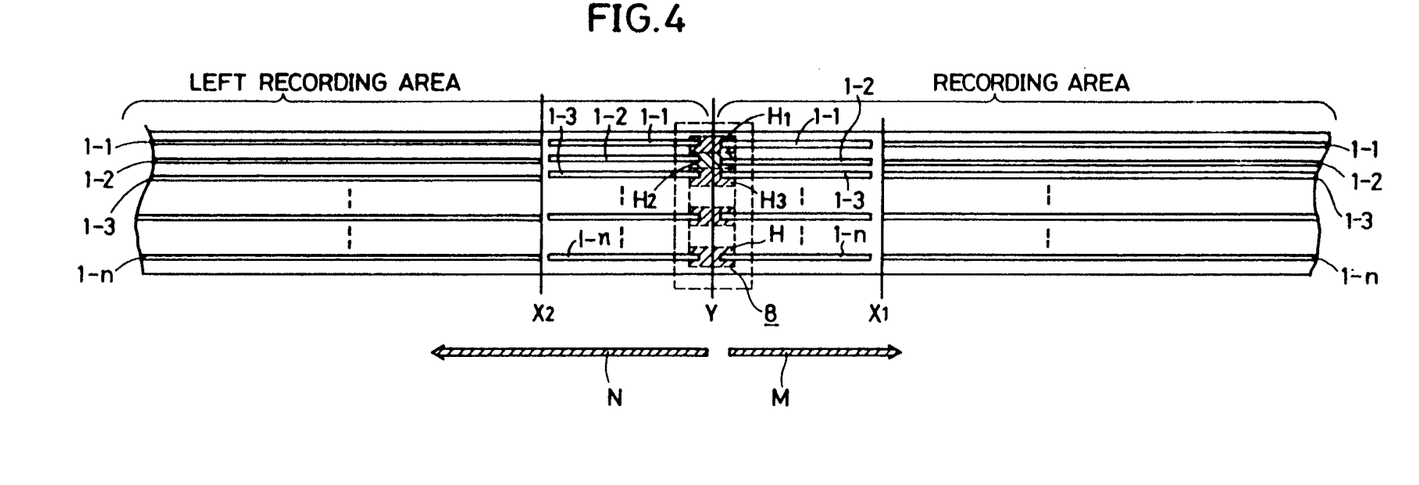
FIG. 4 is a diagram showing a tape format of a magnetic tape in an information recording and reproduction apparatus according to another embodiment of the present invention.

That is to say, the magnetic tape can be moved in both the forward direction and the reverse direction at the time of recording and reproduction, whereby the recording tracks extend not only in one direction in the magnetic tape but both directions. FIG. 4 is a diagram showing a tape format when such a method is adopted and showing another embodiment of the present invention.

Referring to FIG. 4, magnetic tape 3 is divided into an area RIGHT where data is recorded in an arrowed direction M and an area LEFT where information is recorded in an arrowed direction N in FIG. 4. Magnetic tape 3 is controlled so that fixed multi track head 8 may be at a position corresponding to an intermediate point Y of magnetic tape 3 in an initial state. Thus, if magnetic tape 3 is moved in the arrowed direction M at the time of recording and reproduction, then fixed multi track head 8 traces recording tracks 1-1 to 1-n in area LEFT in the arrowed direction N. Conversely, if magnetic tape 3 is moved in the arrowed direction N at the time of recording and reproduction, then fixed multi track head 8 traces recording tracks 1-1 to 1-n in area RIGHT in the arrowed direction M. When the recording and reproduction is completed, magnetic tape 3 is rewound so that intermediate position Y thereof may return to the position of fixed multi track head 8. This makes it possible to start the recording and reproduction always from intermediate position Y of magnetic tape 3. Thus, if the data are recorded depending on their types separately on respective recording tracks 1-1 to 1-n in each of areas RIGHT and LEFT, a maximum of 2n types of information can be recorded on magnetic tape 3.

Additional information as to data recorded in the right-hand area to a position X1 are recorded in the area between intermediate position Y and position X1 on magnetic tape 3. Similarly, additional information as to data recorded in the left-hand area to a position X2 are recorded in the area between intermediate position Y and position X2. In other words, like the case of the foregoing embodiment, the additional information recording area is provided in a leading portion of each of data recording areas RIGHT and LEFT. Accordingly, in this embodiment also, such additional information as a recording address, a recording end address and used recording tracks can be obtained in advance by reading the data recorded in the respective additional information recording areas X2-Y and X1-Y at the time of inserting a tape cassette into apparatus 100. Therefore, it can be informed which recording track the data is to be recorded on, which recording track the data is to be reproduced from, and the like. Thus, the moving direction of magnetic tape 3 at the time of recording and reproduction is determined on the basis of such additional information.

An overall structure of the information recording and reproduction apparatus of this embodiment is the same as information recording and reproduction apparatus 100 of FIG. 1. In this embodiment, controls for the tape and head system such as a determination of the moving direction of magnetic tape 3 at the time of recording and reproduction, and a rewinding of magnetic tape 3 at the time of the end of recording and the end of reproduction are made by information processing apparatus 200 like the case of the foregoing embodiment.

Figure 5:
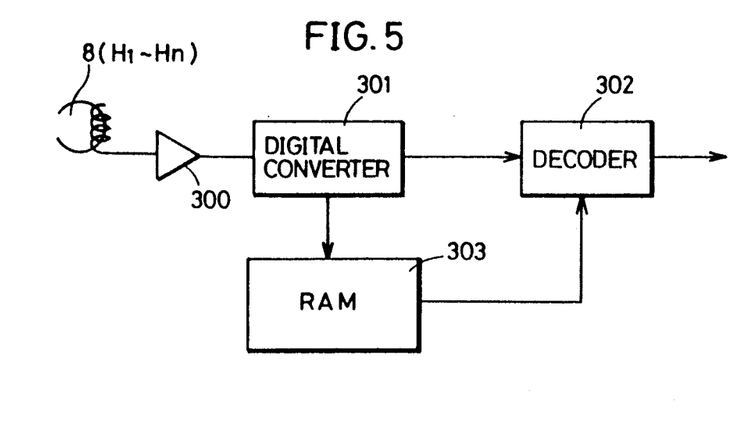
FIG. 5 is a block diagram showing a circuit configuration for bit array conversion necessary for the information recording and reproduction apparatus of the above another embodiment.

At the time of inserting the tape cassette, magnetic tape 3 is moved in both of the arrowed directions M and N so as to read data recorded in an additional information recording area X1-X2. It is noted that fixed multi track head 8 reads the data recorded in area X2-Y in the opposite order to that provided at the time of recording, during the period for which magnetic tape 3 is moved in the arrowed direction N, so that fixed multi track head 8 traces magnetic tape 3 from position X2 to position Y. Thus, a bit array of data reproduced in this period is opposite to that of the inherent data. Similarly, the bit array of the reproduced data is opposite to that provided at the time of recording, during the period for which magnetic tape 3 is moved in the arrowed direction M, so that fixed multi track head 8 traces magnetic tape 3 from position X1 to position Y. Therefore, the bit array of the reproduced data must be converted in order to restore the bit array of the reproduced data during such a period. FIG. 5 is a block diagram showing a circuit configuration for implementing this bit array conversion.

Referring to FIG. 5, signals read by fixed multi track head 8 are amplified by a preamplifier 300 and then applied to a digital converter 301. Digital converter 301 converts the applied reproduction signals, i.e., voltage signals corresponding to electromotive forces induced in respective coils of magnetic head 8 into digital data of "0" or "1" to apply the converted data to an RAM (Random Access Memory) 303. RAM 303 once sequentially stores the digital data applied from digital converter 301 therein, and then serially reads the stored digital data in the opposite order to that provided at the time of storing, to apply the read data to a decoder 302. Decoder 302 decodes the digital data applied from RAM 303 in a predetermined data format and applies the decoded data as final read data to information terminal unit 201 of FIG. 1.

The digital data output from digital converter 301 is directly applied to decoder 302 during the period for which the bit array conversion is unnecessary. Decoder 302 decodes the digital data applied from digital converter 301 to apply the decoded data to information terminal unit 201.

Those functional blocks 301-303 are included in recording and reproducing circuit 104 in information recording and reproduction apparatus 100 of FIG. 1.

As mentioned above, according to this embodiment, the number of types of information that can be recorded on the magnetic tape can be doubled without increasing the width of the magnetic tape. Thus, even if a magnetic tape with a small tape width is used as a recording medium, information of types as many as types of information provided when recording tracks are formed in only one direction on a magnetic tape with a large tape width (e.g., 6 mm or 8 mm) can be recorded. However, in order that the amount of information that can be recorded is further increased, the same data recording and reproducing system as that of this embodiment may be applied by use of the magnetic tape with a large tape width.

In the present technology, it is possible to form recording tracks of approximately 50 to 60 channels on a magnetic tape of 3.81 mm in width. As apparent from such a circumstance, the recording density of information on a magnetic tape becomes sufficient for use of the magnetic tape as a recording medium of an information recording and reproduction apparatus for an information processing apparatus. Accordingly, in accordance with the above described embodiments, an information recording and reproduction apparatus can be implemented which has a faster recording function and a faster search and reproducing function and can be made thinner despite its larger recording capacity.

In both of the foregoing embodiments, the length of each recording track formed on the magnetic tape is fixed in advance. Thus, both the foregoing embodiments are more effective when applied to information processing apparatus (copiers, facsimile devices, word processors, personal computers and the like) in which the length of data to be recorded is predetermined to some extent.

While FIG. 1 shows the case where the magnetic recording and reproduction apparatus of the present invention is provided separately outside the information processing apparatus, the magnetic recording and reproduction apparatus of the present invention may be incorporated in the information processing apparatus.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetic recording and reproduction apparatus for recording a plurality of independent data on a plurality of recording tracks on a magnetic tape which are parallel to a moving direction of the magnetic tape and share a same starting position and for reproducing said plurality of independent data from said plurality of recording tracks, said magnetic recording and reproduction apparatus comprising:
    a plurality of magnetic heads located at the same position,
    said plurality of magnetic heads being arranged in parallel to a width direction of said magnetic tape so as to correspond to said plurality of recording tracks in a one-to-one correspondence,
    said plurality of independent data corresponding to said plurality of recording tracks in a one-to-one correspondence;
    magnetic tape drive circuit means for moving said magnetic tape so as to record data onto said magnetic tape and reproduce the data from said magnetic tape; and
    control means for controlling said drive circuit means and being responsive to an end position of said recording of data and an end position of said reproduction of data on said magnetic tape for immediately returning said magnetic tape to said starting position, said starting position corresponding to a predetermined initial position of said plurality of magnetic heads relative to said magnetic tape.

2. The magnetic recording and reproduction apparatus according to claim 1, wherein
    said plurality of magnetic heads each comprise thin film heads.

3. The magnetic recording and reproduction apparatus according to claim 2, wherein
    said plurality of recording tracks are formed on said magnetic tape to extend in only one direction from said starting position.

4. The magnetic recording and reproduction apparatus according to claim 3, wherein
    said starting position is on one side of said magnetic tape 5. The magnetic recording and reproduction apparatus according to claim 2, wherein
    said plurality of recording tracks include a plurality of first recording tracks and a plurality of second recording tracks formed on said magnetic tape to extend in opposite first and second directions from said starting position, respectively.

6. The magnetic recording and reproduction apparatus according to claim 5, wherein
said starting position is substantially at the midpoint along the length of said magnetic tape.

7. The magnetic recording and reproduction apparatus according to claim 3, wherein
each of said plurality of recording tracks includes
a first area where corresponding data of said plurality of independent data is recorded, and
a second area where information required for searching for said corresponding data from said magnetic tape is recorded.

8. The magnetic recording and reproduction apparatus according to claim 7, wherein
said second area is set at a predetermined distance from said starting position, and
said first area is set at an arbitrary distance corresponding to the amount of said corresponding data from a position that separates said starting position from said second area.

9. The magnetic recording and reproduction apparatus according to claim 5, wherein
each of said plurality of first and second recording tracks includes
a first area where corresponding data of said plurality of independent data is recorded, and
a second area where information required for searching for said corresponding data from said magnetic tape is recorded.

10. The magnetic recording and reproduction apparatus according to claim 9, wherein
said second area is set at a predetermined distance from said starting position, and
said first area is set at an arbitrary distance corresponding to the amount of said corresponding data from a position that separates said starting position from said second area.

11. The magnetic recording and reproduction apparatus according to claim 8, further comprising:
recording and reproducing means for converting said plurality of independent data in a single format conforming to recording onto said magnetic tape, to simultaneously apply the converted data to said plurality of magnetic heads at the time of said recording, and simultaneously accept output signals of said plurality of magnetic heads at the time of said reproduction, wherein
said magnetic tape drive circuit means moves said magnetic tape in an opposite direction to said one direction at the time of said recording and at the time of said reproduction, and immediately moves said magnetic tape in said one direction in response to each said end position of said recording and said reproduction of data.

12. The magnetic recording and reproduction apparatus according to claim 10, further comprising:
recording and reproducing means for converting said plurality of independent data in a single format conforming to a recording onto said magnetic tape, to simultaneously apply the converted data to said plurality of magnetic heads at the time of said recording, and simultaneously accept output signals of said plurality of magnetic heads at the time of said reproduction, wherein
said magnetic tape drive circuit means moves said magnetic tape in one of said first and second directions at the time of said recording and at the time of said reproduction, and immediately moves said magnetic tape in an opposite direction to said one direction in response to the respective end positions of said recording and reproduction of data.

13. The magnetic recording and reproduction apparatus according to claim 10, further comprising:
recording and reproducing means for converting said plurality of independent data in a single format conforming to a recording onto said magnetic tape, to simultaneously apply the converted data to said plurality of magnetic heads at the time of said recording, and simultaneously accept output signals of said plurality of magnetic heads at the time of said reproduction, wherein
said magnetic tape drive circuit means further moves said magnetic tape in said second direction for data reproduction from said second area of each of said plurality of first recording tracks, and moves said magnetic tape in said first direction for data reproduction from said second area of each of said plurality of second recording tracks.

14. The magnetic recording and reproduction apparatus according to claim 13, wherein
said recording and reproducing means includes
conversion means for converting the output signal accepted from each of said plurality of magnetic heads sequentially into a digital signal during a period of which said magnetic tape drive circuit means is moving said magnetic tape in said second direction for the data reproduction from said second area of each of said plurality of first recording tracks,
primary data storage means for sequentially storing the digital signal converted by said conversion means therein and thereafter reading said stored digital signal in an opposite order to the order provided at the time of said storage, and
decoding means for decoding the digital signal read by said primary storage means in a predetermined data format.

15. A magnetic recording and reproduction apparatus for recording/reproducing data onto/from a magnetic tape, comprising:
a plurality of magnetic heads arranged so as to be fixedly located at a predetermined position over said magnetic tape in parallel to a width direction thereof for recording/reproducing a plurality of independent data onto/from said magnetic tape; and
means for driving said magnetic tape in a predetermined direction for said recording and said reproduction, and responsive to both the end position of said recording and the end position of said reproduction for immediately moving said magnetic tape so as to restore said predetermined position of said magnetic tape to the position of said plurality of magnetic heads.

16. An operation method of a magnetic recording and reproduction apparatus for recording/reproducing data onto/from a magnetic tape, comprising the steps of:
locating a plurality of linearly arranged magnetic heads for recording/reproducing a plurality of independent data onto/from said magnetic tape at a predetermined position of said magnetic tape in parallel with a width direction of said magnetic tape;

translating said magnetic tape in a predetermined direction for said recording and said reproduction; and immediately translating said magnetic tape so as to restore said predetermined position of said magnetic tape to the position of said plurality of magnetic heads in response to each end position of said recording and to each end position of said reproduction.

* * * * *